US010839197B2

(12) United States Patent
Sotodate et al.

(10) Patent No.: US 10,839,197 B2
(45) Date of Patent: *Nov. 17, 2020

(54) MONITORING SYSTEM, MONITORING CAMERA, AND MANAGEMENT DEVICE

(71) Applicant: Panasonic i-PRO Sensing Solutions Co., Ltd., Fukuoka (JP)

(72) Inventors: Hiromichi Sotodate, Fukuoka (JP); Hideo Noguchi, Fukuoka (JP)

(73) Assignee: Panasonic i-PRO Sensing Solutions Co., Ltd., Fukuoka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/511,982

(22) Filed: Jul. 15, 2019

(65) Prior Publication Data

US 2019/0340417 A1 Nov. 7, 2019

Related U.S. Application Data

(63) Continuation of application No. 15/624,348, filed on Jun. 15, 2017, now Pat. No. 10,438,049.

(30) Foreign Application Priority Data

Jul. 15, 2016 (JP) ................................ 2016-140438

(51) Int. Cl.
*G06K 9/00* (2006.01)
*H04N 7/18* (2006.01)
(52) U.S. Cl.
CPC ..... *G06K 9/00255* (2013.01); *G06K 9/00288* (2013.01); *G06K 9/00295* (2013.01); *G06K 9/00771* (2013.01); *H04N 7/181* (2013.01)

(58) Field of Classification Search
CPC .......... G06K 9/00221; G06K 9/00302; H04N 5/23219
See application file for complete search history.

(56) References Cited

U.S. PATENT DOCUMENTS

| 2003/0048926 A1* | 3/2003 | Watanabe | G06K 9/00362 |
| | | | 382/103 |
| 2003/0107649 A1* | 6/2003 | Flickner | G06K 9/00362 |
| | | | 348/150 |

(Continued)

FOREIGN PATENT DOCUMENTS

| JP | 2005-353046 A | 11/2005 |
| JP | 2007-241377 A | 9/2007 |

(Continued)

OTHER PUBLICATIONS

Japanese Office Action, dated Mar. 31, 2020, for Japanese Application No. 2016-140438, 9 pages. (With English machine translation).

*Primary Examiner* — Pankaj Kumar
*Assistant Examiner* — Timothy R Newlin
(74) *Attorney, Agent, or Firm* — Seed IP Law Group LLP

(57) ABSTRACT

There is provided a monitoring system which includes a plurality of monitoring cameras and a management device. The management device transmits feature information relevant to a person to one or more first monitoring cameras and receives check results, and transmits time information in which the person is captured to second monitoring cameras based on the check results. The management device specifies the person based on a check result acquired in such a way that the second monitoring cameras perform a check using the time information.

10 Claims, 11 Drawing Sheets

(56) References Cited

U.S. PATENT DOCUMENTS

| | | | |
|---|---|---|---|
| 2004/0257444 A1* | 12/2004 | Maruya | G08B 13/19645 348/169 |
| 2005/0057653 A1* | 3/2005 | Maruya | G08B 13/19608 348/159 |
| 2005/0220361 A1* | 10/2005 | Yamasaki | G06K 9/00785 382/284 |
| 2006/0251338 A1* | 11/2006 | Gokturk | G06K 9/00375 382/305 |
| 2007/0206834 A1 | 9/2007 | Shinkai et al. | |
| 2008/0316328 A1 | 12/2008 | Steinberg et al. | |
| 2009/0087038 A1* | 4/2009 | Okada | G06K 9/00268 382/118 |
| 2011/0058028 A1* | 3/2011 | Sakai | G06K 9/00288 348/77 |
| 2011/0115937 A1* | 5/2011 | Sassa | G06K 9/00221 348/222.1 |
| 2011/0142300 A1* | 6/2011 | Zhang | G06K 9/00295 382/118 |
| 2012/0026335 A1* | 2/2012 | Brown | G01S 5/16 348/159 |
| 2013/0148858 A1 | 6/2013 | Wiegenfeld et al. | |
| 2014/0006513 A1* | 1/2014 | Takaoka | G06Q 50/01 709/204 |
| 2015/0092997 A1* | 4/2015 | Yamaguchi | G06K 9/00221 382/118 |
| 2016/0187139 A1* | 6/2016 | Agulnik | G01C 21/00 701/409 |
| 2018/0293612 A1* | 10/2018 | Yuasa | G07G 1/01 |

FOREIGN PATENT DOCUMENTS

| | | |
|---|---|---|
| JP | 2009-75916 A | 4/2009 |
| JP | 2013-69128 A | 4/2013 |
| JP | 2014-187645 A | 10/2014 |
| WO | 2016/031720 A1 | 3/2016 |

* cited by examiner

FIG. 8

| DATE AND TIME | CAMERA NUMBER | FACIAL IMAGE | FULL-LENGTH IMAGE | HEIGHT | CORRECT ANSWER CHECK |
|---|---|---|---|---|---|
| 13:02 | No. 1 | | | 155cm | ☐ |
| 13:20 | No. 2 | | | 160cm | ☑ |
| 13:22 | No. 3 | | | 160cm | ☑ |
| 13:59 | No. 4 | | | 160cm | ☑ |

| PERSON | NUMBER OF TIMES OF APPEARANCES |
|---|---|
| PERSON pa | 22 TIMES |
| PERSON pb | 3 TIMES |
| PERSON pc | 2 TIMES |
| ⋮ | ⋮ |

LS2

FIG. 11
| DATE AND TIME | CAMERA NUMBER | FACIAL IMAGE | FULL-LENGTH IMAGE | HEIGHT |
|---|---|---|---|---|
| 13:30 | No. 21 |  |  | 168cm |
| 13:35 | No. 22 |  |  | 168cm |
| 13:42 | No. 23 |  |  | 168cm |
| ... | ... | ... | ... | |
LS3

MONITORING SYSTEM, MONITORING CAMERA, AND MANAGEMENT DEVICE

BACKGROUND

1. Technical Field

The present disclosure relates to a monitoring system, a monitoring camera, and a management device.

2. Description of the Related Art

In recent years, incidents, such as kidnapping, lost child, and snatching, frequently occur. Therefore, a plurality of monitoring cameras are installed in roads and buildings in a district. In a case where the plurality of monitoring cameras are installed, the incidents are prevented from occurring or the incidents are early resolved based on videos captured by the plurality of monitoring cameras.

As the related art, a monitoring system is known in which each monitoring camera transmits a still image to a host device, and the host device performs a facial check between the received still image and a facial image of a database and requests the monitoring camera for a moving image based on a check result (for example, refer to Japanese Patent Unexamined Publication No. 2005-323046). In the monitoring system, the monitoring camera cuts the facial image and transmits the cut facial image, and the host device performs a face checking process using the facial image and transmits the transmission request of the moving image to the monitoring camera.

However, in the related art, the monitoring camera transmits the still image to the host device (management device), and the host device performs the face check. Therefore, a processing load is large in the host device. For example, in a case where the host device receives still images from the plurality of monitoring cameras, which are installed in the district and performs the face check, the processing load relevant to the face check performed by the host device is large, and thus there is a possibility that process delay occurs. In a case where a processing result is rapidly required, it is conceivable that it is difficult to perform rapid treatment in a technology disclosed in Japanese Patent Unexamined Publication No. 2005-323046.

SUMMARY

The present disclosure is made in consideration of the above-mentioned circumstances, and provides a monitoring system, a monitoring camera, and a management device, in which it is possible to reduce a processing load of the management device and to rapidly detect a specific person.

According to the present disclosure, there is provided a monitoring system including: a plurality of monitoring cameras that capture images; and a management device that is connected to the monitoring cameras. The management device transmits first feature information relevant to a first person to one or more first monitoring cameras. Each of the first monitoring cameras performs a first check with respect to a first image, which is captured by the first monitoring cameras, using the received first feature information, and transmits a first check result to the management device. The management device transmits time information based on time, in which the first image including the first person is captured, to second monitoring cameras, which capture the first image relevant to the time information, among the first monitoring cameras based on the first check result. Each of the second monitoring cameras performs a second check with respect to a second image, which is captured by the second monitoring cameras, using the received time information, and transmits a second check result to the management device. The management device specifies a second person based on the second check result.

According to the present disclosure, there is provided a monitoring camera which is connected to a management device and captures an image. The monitoring camera includes an image sensor, a processor, and a communication device. The image sensor captures an image of a first person. The processor detects a feature quantity of the first person from the image. The communication device receives first feature information relevant to the first person from the management device. The processor performs a first check of checking the first feature information and the feature quantity of the first person. The communication device transmits a first check result to the management device.

According to the present disclosure, there is provided a management device, which is connected to monitoring cameras, including: a processor; and a communication device. The communication device transmits first feature information relevant to a first person to one or more first monitoring cameras, receives a first check result using the first feature information from each of the first monitoring cameras, transmits time information based on time, in which a first image including the first person is captured, to second monitoring cameras, which capture the first image including the first person, among the first monitoring cameras based on the first check result, receives a second check result from the second monitoring cameras using the time information. The processor specifies a second person based on the second check result.

According to the present disclosure, it is possible to reduce a processing load of the management device and it is possible to rapidly detect a specific person.

BRIEF DESCRIPTION OF THE DRAWINGS

FIG. 8 is a table illustrating an example of a victim list in a high frequency area;

FIG. 9 is a table illustrating an example of a same person list;

FIG. 11 is a table illustrating an example of a suspect list in the high frequency area.

DETAILED DESCRIPTION

Hereinafter, embodiments will be appropriately described in detail with reference to the accompanying drawings. However, there is a case where description, which is detailed more than need, is omitted. For example, there is a case where detailed description of already well-known items and repeated description with respect to substantially the same configuration are omitted. The reason for this is to avoid description below from being unnecessarily redundancy and to make those skilled in the art to easily understand. Also, the accompanying drawings and description below are provided such that those skilled in the art sufficiently understand the present disclosure but do not intend to limit subjects disclosed in claims.

First Embodiment

[Configuration or the Like]

Figure 1:
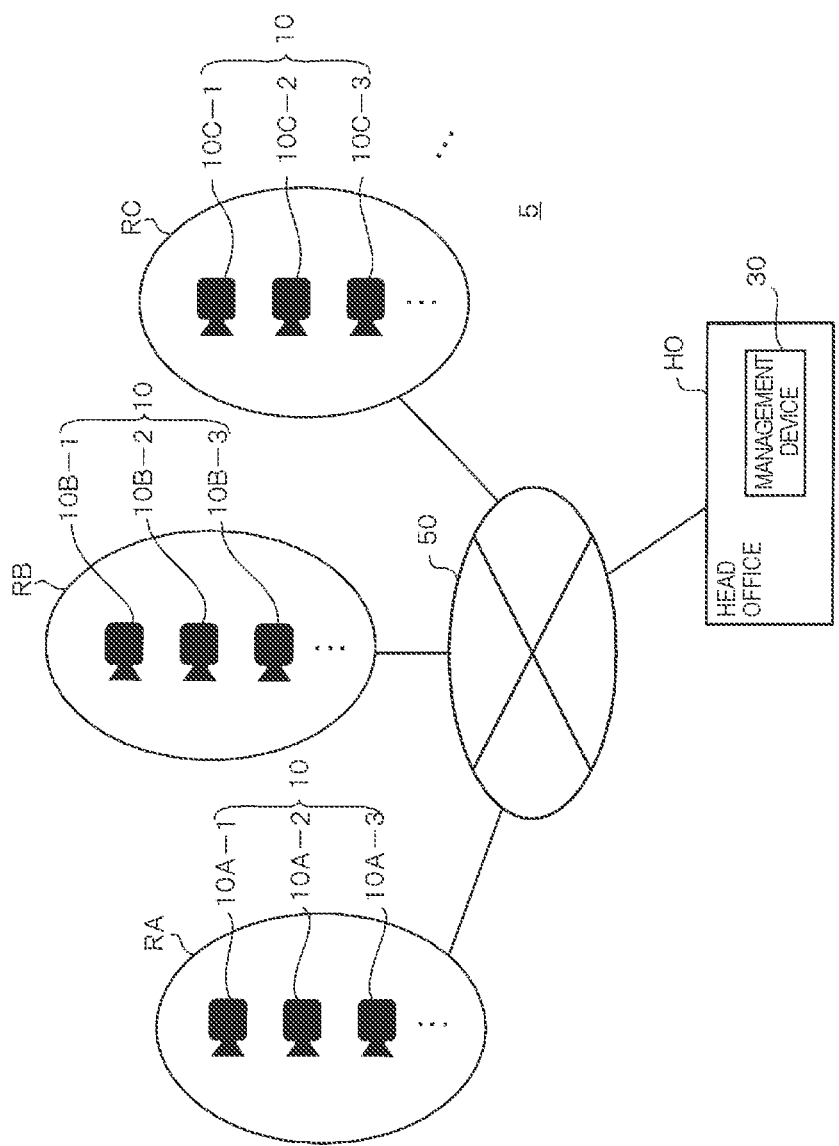
FIG. 1 is a diagram illustrating an example of a schematic configuration of a monitoring system according to an embodiment.

FIG. 1 is a diagram illustrating a schematic configuration of monitoring system 5 according to a first embodiment. Monitoring system 5 includes a plurality of monitoring cameras 10 which are installed for each of areas RA, RB, and RC, and management device 30 which is installed in head office HO. The plurality of monitoring cameras 10 are connected to management device 30 through network 50 such that data communication is possible.

Here, areas RA, RB, and RC indicate predetermined districts, for example, regions of a city. An arbitrary method is used to determine the districts.

In addition, the plurality of monitoring cameras 10, which capture a video in area RA, are distinguished as monitoring cameras 10A-1, 10A-2, . . . , 10A-n (n is an arbitrary integer). In the same manner, the plurality of monitoring cameras 10, which capture a video in area RB, are distinguished as monitoring cameras 10B-1, 10B-2, . . . , 10B-n, and the plurality of monitoring cameras 10, which captures video in area RC, are distinguished as monitoring cameras 10C-1, 10C-2, . . . , 10C-n. Meanwhile, in a case where the monitoring cameras are distinguished for respective districts, the monitoring cameras are referred to as monitoring camera 10A, monitoring camera 10B, and monitoring camera 10C. In addition, in a case where it is not particularly necessary to distinguish the monitoring cameras for the respective districts, the monitoring cameras are generally named as monitoring cameras 10. The number of monitoring cameras 10 which are installed for each district is not particularly limited, and may be an arbitrary number.

In addition, head office HO includes, for example, a police station, a municipal office, a prosecutor's office, and the like. Head office HO may be installed in a district of any one of areas RA, RB, and RC, or may be installed on the outside of areas RA, RB, and RC. Here, a case in which head office HO is installed in area RA is illustrated.

Figure 2:
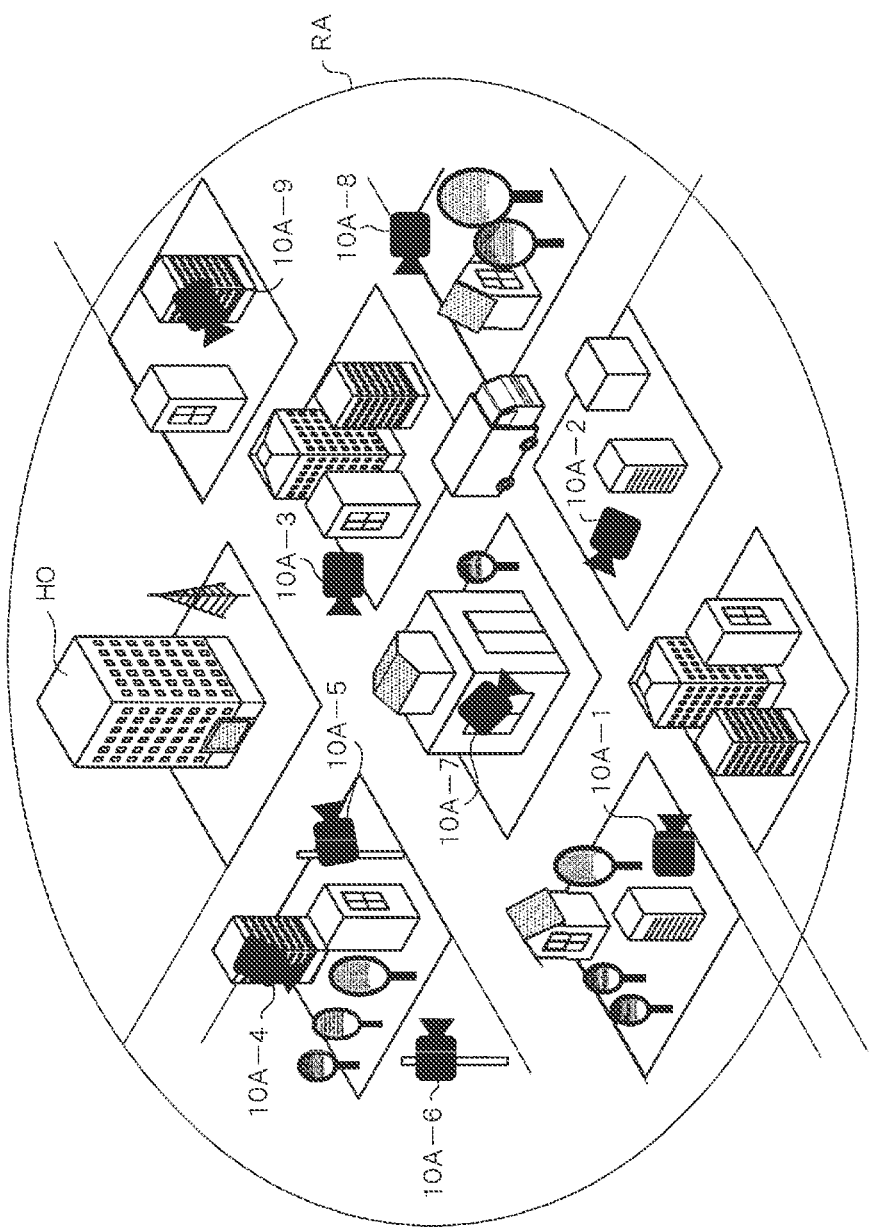
FIG. 2 is a schematic diagram illustrating a three-dimensional map of an area where a plurality of monitoring cameras are installed.

FIG. 2 is a diagram illustrating a three-dimensional map of area RA in which the plurality of monitoring cameras 10A are installed. In a town, in which a plurality of buildings are arranged, of area RA, the plurality of (here, nine) monitoring cameras 10A-1 to 10A-9 are installed. Monitoring cameras 10A-1 to 10A-9 are connected to management device 30 in head office HO, respectively, through network 50.

Figure 3:
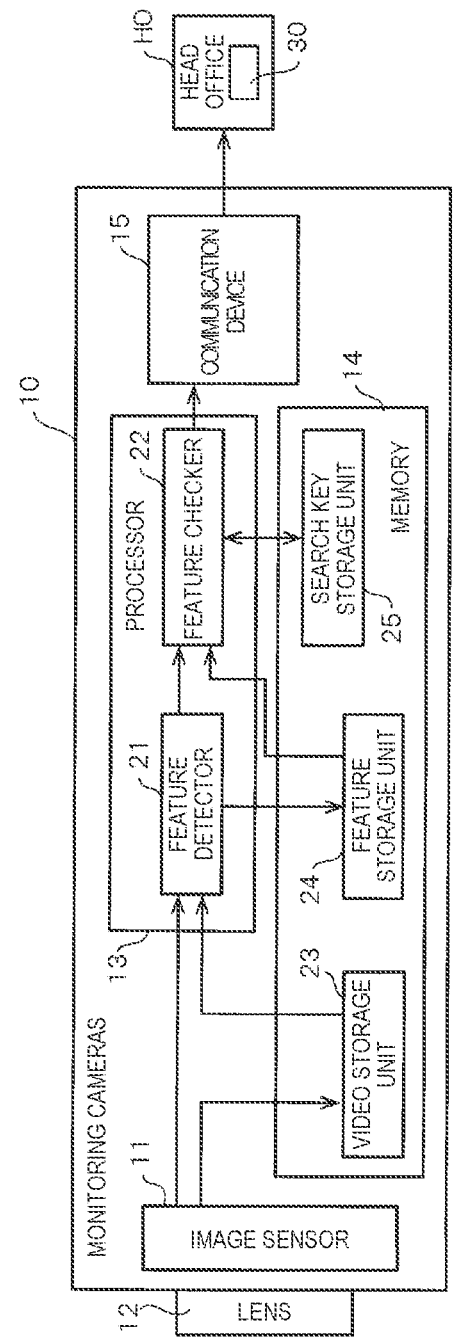
FIG. 3 is a block diagram illustrating an example of a configuration of each of the monitoring cameras.

FIG. 3 is a block diagram illustrating a configuration of each of monitoring cameras 10. As described above, monitoring cameras 10 are installed in each of areas RA, RB, and RC, capture prescribed capturing ranges as subjects, and transmit feature quantities of images and information of various check results to management device 30 of head office HO based on video signals. In addition, each of monitoring cameras 10 receives information, such as a search key, from management device 30. Each of monitoring cameras 10 includes image sensor 11, lens 12, processor 13, memory 14, and communication device 15.

Lens 12 forms an optical image of a subject on an image capturing surface of image sensor 11. Lens 12 may include a fish-eye lens which captures a fish-eye image, a capturing lens in which lens magnification is set such that the prescribed capturing range is captured, a zoom lens which can change a magnification of the lens, and the like.

Image sensor 11 includes a sensor substrate on which an image capturing element, such as a complementary Metal Oxide Semiconductor (CMOS) or a Charge Coupled Device (CCD), is mounted. Image sensor 11 captures the optical image formed by lens 12, generates an electric signal (video signal), and outputs the video signal. In addition, together with image sensor 11 or instead of image sensor 11, at least one of a distance sensor, a temperature sensor, an infrared sensor, and a radio wave sensor may be used.

Processor 13 includes, for example, a Central Processing Unit (CPU), a Digital Signal Processor (DSP), and a Graphics Processing Unit (GPU). Processor 13 controls an operation of each of monitoring cameras 10 by executing a program maintained in memory 14, and has functions of feature detector 21 and feature checker 22.

Feature detector 21 extracts a feature quantity, such as a face, a color, height, a thumbnail image (for example, a facial image or a full-length image), a type of a vehicle, or a vehicle number, from an image based on the video signal which is output from image sensor 11. In addition, the feature quantity may include information (metadata) relevant to capturing, such as an image capturing time and a capturing place, based on the video signal.

Feature checker 22 checks the feature quantity which is extracted by feature detector 21 and the feature quantity which is stored in feature storage unit 24, and performs matching between the feature quantities, and determines consistency (coincidence) or inconsistency using, for example, a threshold. For example, in a case where the number of feature points, which are consistent in two thumbnail images, is equal to or greater than a prescribed threshold, it is determined that the images are consistent. In addition, in a case where a difference between two feature quantities which indicate height is equal to or less than the prescribed threshold, it is determined that both images are consistent. A check which is performed by feature checker 22 includes, for example, a victim check, a time check, and a suspect check which will be described later.

Memory 14 includes a primary storage device such as a Read Only Memory (ROM) or a Random Access Memory (RAM). In addition, memory 14 may include a secondary storage device, such as a Hard Disk Memory (HDD) or a Solid State Drive (SSD), and a tertiary storage device such as a USB memory or an SD card.

Memory 14 stores various data, and includes video storage unit 23, feature storage unit 24, and search key storage unit 25.

Video storage unit 23 stores images based on the video signal which is captured by image sensor 11.

Feature storage unit 24 stores the feature quantity which is extracted by feature detector 21. For example, feature detector 21 extracts the feature quantities of entire or some people included in the image based on the video signal.

Feature storage unit 24 may store the extracted feature quantities for respective people.

Search key storage unit 25 stores a check search key which is transmitted from management device 30 of head office HO. The search key includes a face, a color, height, a thumbnail image (for example, a facial image or a full-length image), a type of a vehicle, a vehicle number, and the like, and corresponds to the feature quantity.

Communication device 15 includes a communication device, is connected to management device 30 of head office HO through a wired line or a wireless line, and communicates various data. Communication device 15 may be connected to management device 30 through network 50, such as the Internet, or may be directly connected to management device 30 through a dedicated line.

Figure 4:
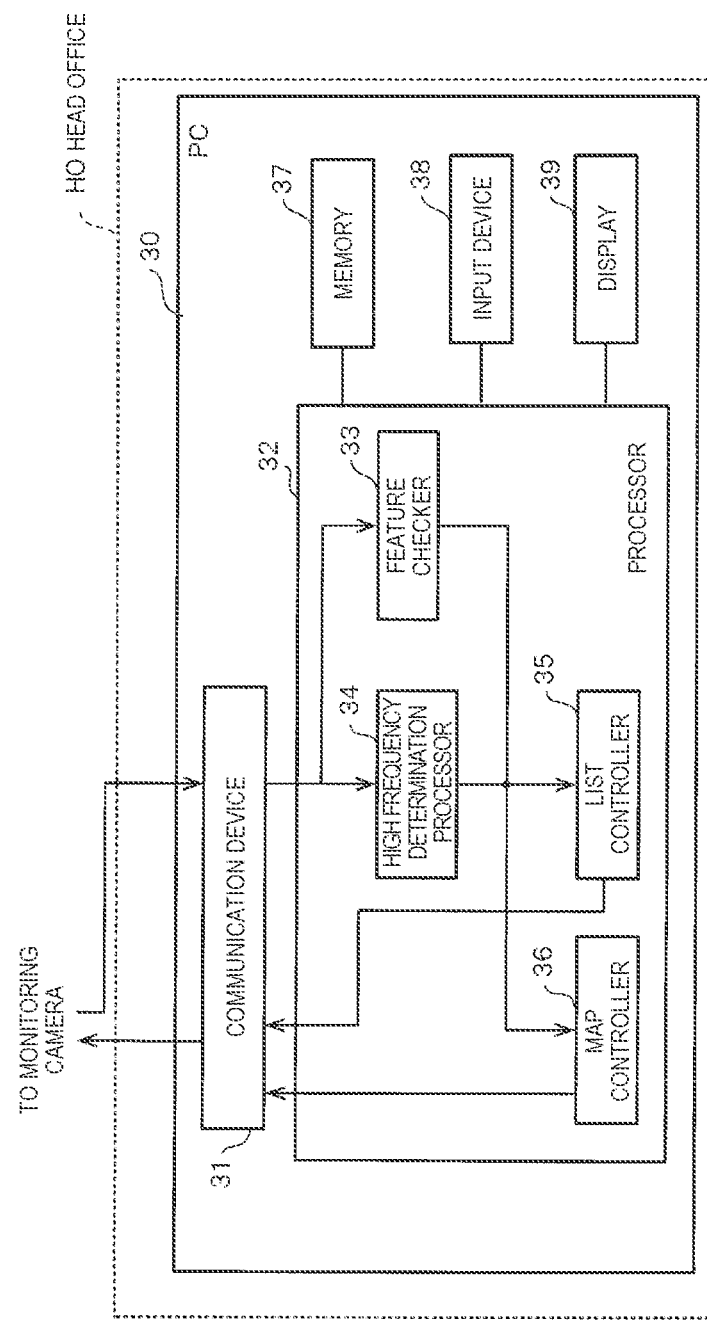
FIG. 4 is a block diagram illustrating an example of a configuration of a management device installed in a head office.

FIG. 4 is a block diagram illustrating a configuration of management device 30. Management device 30 receives information, such as video signals which are transmitted from monitoring cameras 10, performs a process of checking feature quantities from images based on the received video signals, and transmits the search key to monitoring cameras 10 based on check results. Management device 30 includes, for example, a general-purpose PC (computer device) and a server. Management device 30 includes communication device 31, processor 32, memory 37, input device 38, and display 39.

Communication device 31 is connected to monitoring cameras 10, which are installed in each of the areas through a wired line or a wireless line, and communicates various data. Communication device 31 may be connected to monitoring cameras 10 through network 50, such as the Internet, or may be directly connected to monitoring cameras 10 through a dedicated line. For example, communication device 31 transmits the search key to monitoring cameras 10. In addition, communication device 31 receives the feature quantities of the captured images or data relevant to the check results from monitoring cameras 10.

Processor 32 includes, for example, a CPU, a DSP, and a GPU. Processor 32 controls an operation of management device 30 by executing a program maintained in memory 37, and has functions of feature checker 33, high frequency determination processor 34, list controller 35, and map controller 36.

Feature checker 33 checks a plurality of feature quantities, and performs, for example, a mutual check of checking the feature quantities included in a plurality of images in round robin manner. In the mutual check, for example, it is determined whether or not people included in the plurality of images are the same person.

High frequency determination processor 34 determines a high frequency area according to a well-known clustering algorithm, such as a Latent Dirichlet Allocation (LDA) and a Support Vector Machine (SVM), based on locations (camera locations) in which monitoring cameras 10 are installed and results (for example, the check results from monitoring cameras 10) which are received by communication device 31. The LDA and the SVM are, for example, a machine learning-type algorithm.

The high frequency area is, for example, an area where monitoring cameras 10, which capture images that are assumed to include the feature quantities of a victim or a suspect as the check results, are concentrated (widespread) over a prescribed density. With regard to the camera locations, for example, identification information (for example, camera number) of each of monitoring cameras 10 is associated with installation location information of each of monitoring cameras 10, and information acquired through the association is maintained in memory 14.

Map controller 36 generates map information based on a determination result of high frequency determination processor 34 and a check result of feature checker 33, and displays the map information on display 39. The map illustrates camera locations of monitoring cameras 10, which capture the images (that is, images which include coinciding feature quantities as the check results using the search key) in which the feature quantities of the victim and the suspect are detected, in each of the areas. In addition, map controller 36 may deliver the search key, which is used to check the feature quantities of the images in monitoring cameras 10, to communication device 31. Also, the search key includes, for example, time information, in which the images where the feature quantities of the victim and the suspect are detected are captured, and camera location information. The map may be displayed after being divided for each area, or may be displayed after being divided for each capturing time zone.

List controller 35 generates list information based on the determination result of high frequency determination processor 34 and the check result of feature checker 33, and displays the list information on display 39. The list indicates at least a part of the feature quantities of the images in which the feature quantities of the victim and the suspect are detected. In the list, at least a part of the feature quantities of the images in which the feature quantities of the victim and the suspect are detected may be displayed only for the high frequency area. In addition, list controller 35 may deliver the search key, which is used to check the feature quantities of the images in monitoring cameras 10, to communication device 31. The list may be displayed after being divided for each area, or may be divided after being divided for each capturing time zone.

Memory 37 includes a primary storage device such as a ROM or a RAM. In addition, memory 14 may include a secondary storage device, such as an HDD and an SSD, and a tertiary storage device such as a USB memory or an SD card. Memory 37 stores various data.

Input device 38 includes, for example, a mouse, a keyboard, a touch panel, a microphone, and the like. Input device 38 inputs various data through a user manipulation or the like.

Display 39 includes, for example, a Liquid Crystal Display (LCD), and displays various data (for example, the images based on the video signals).

[Operation or the Like]

Figure 5:
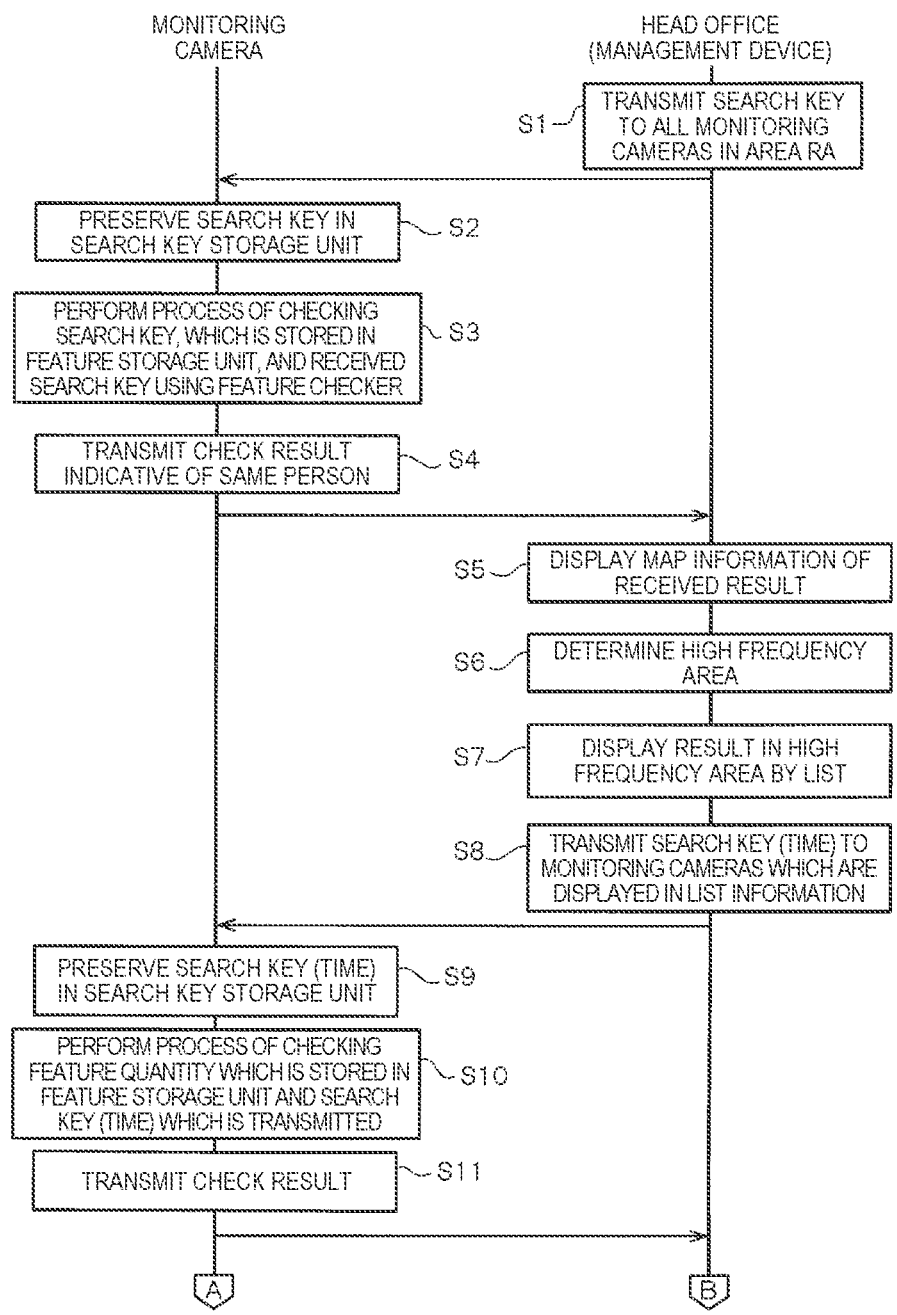
FIG. 5 is a sequence diagram illustrating an example of an operation of the monitoring system.
Figure 6:
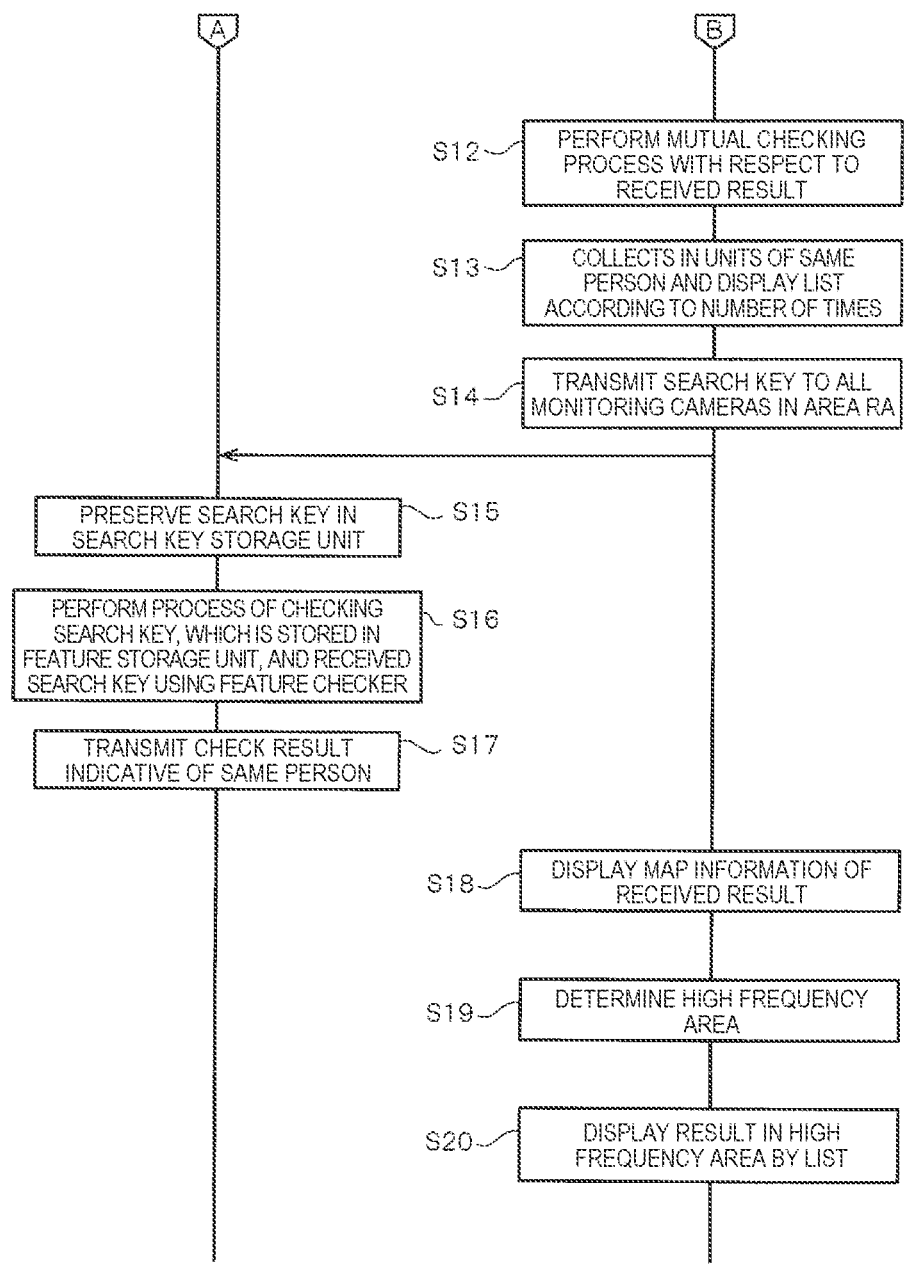
FIG. 6 is a sequence diagram illustrating an example of the operation of the monitoring system subsequent to FIG. 5.

Subsequently, an operation of monitoring system 5 will be described. FIGS. 5 and 6 are sequence diagrams illustrating the operation of monitoring system 5. Here, as an example, it is assumed that a kidnapping incident occurs and suspect searching is performed in a police station which is a head office.

First, management device 30 in head office HO transmits a search key which is previously input to each of monitoring cameras 10A in area RA through communication device 31 (S1). It is assumed that the search key is transmitted to monitoring cameras 10A in area RA which is an area where the victim is normally located. An area where the victim is normally located is estimated (area estimation) based on a place where the victim is last seen, a zone of life of the victim, a place where a GPS signal is last transmitted from a mobile phone (for example, a smart phone, a mobile phone, or crime prevention equipment) which is possessed by the victim, a history in which facilities for transportation are used, a history in which a cash dispenser is used, or the like.

The search key, which is transmitted in S1, is the feature quantity of the victim, and includes, for example, a facial image of the victim, a color or a shape of clothes, a full-length image, and height. The feature quantity is an example of information which is acquired in such a way that a police officer asks a family of the victim. The police officer inputs the feature quantity as the search key to management device 30 through input device 38 or the like in advance.

In a case where each of monitoring cameras 10A receives the search key, which is transmitted from management device 30 through communication device 15, each of monitoring cameras 10A stores the search key in search key storage unit 25 within memory 14 (S2).

Also, management device 30 may transmit, for example, an image which is captured by a digital camera of the family of the victim, to each of monitoring cameras 10A, and feature detector 21 of each of monitoring cameras 10A may extract the feature quantity from the received image. The feature quantity may be stored in search key storage unit 25 within memory 14.

Feature checker 22 of each of monitoring cameras 10A checks (performs the victim check) the feature quantity stored in feature storage unit 24 and the feature quantity stored in search key storage unit 25 (S3).

In a case where the feature quantities are consistent and a check result indicative of the same person is acquired, each of monitoring cameras 10A transmits the check result (also referred to as a victim check result) to management device 30 through communication device 15 (S4). The victim check result includes information such as a camera number of each of monitoring cameras 10A which perform capturing, capturing time, the facial image of the victim, the full-length image, the height, and the like. Here, the facial image and the full-length image correspond to thumbnails (reduced images). In a case where the thumbnail is used, it is possible to reduce the amount of data, thereby reducing traffic.

In a case where communication device 31 of management device 30 receives the victim check results which are transmitted from monitoring cameras 10, map controller 36 displays map information MA, in which the victim check results are reflected, on display 39 (S5).

Figure 7:
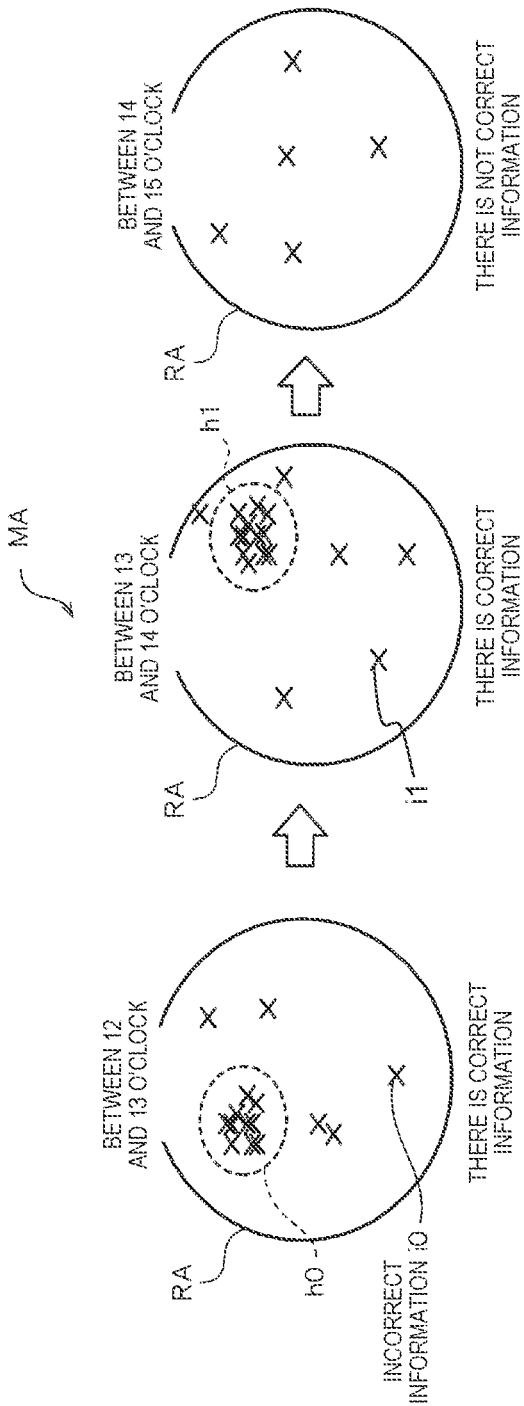
FIG. 7 is a diagram illustrating an example of map information, in which a check result with respect to a feature quantity of a victim is reflected, in a time series.

FIG. 7 is a diagram illustrating map information MA, in which the victim check results with respect to the feature quantity of the victim are reflected, in a time series. In map information MA, the camera locations of monitoring cameras 10A, which transmit the victim check results indicative of detection of the feature quantity of the victim, are indicated by symbols "x" in area RA. Also, the camera locations which are indicated by symbols "x" include correct information in which the feature quantity of the victim is correctly detected and incorrect information in which the feature quantity of the victim is wrongly detected.

For example, in area RA, in a case where the camera locations of monitoring cameras 10A which detect the feature quantity of the victim are unevenly gathered (maldistributed) in a prescribed area, a feature quantity detection result within the area is probable, thereby being determined as the correct information. In contrast, in area RA, in a case where the camera locations of monitoring cameras 10A which detect the feature quantity of the victim are independently located on the outside of the maldistributed area, the feature quantity detection result is unreliable, thereby being determined as the incorrect information.

Specifically, in the map information between 12 and 13 o'clock of FIG. 7, a large number of camera locations are gathered in a range surrounded by dotted-line frame h0 in area RA. In this case, feature quantity detection results acquired by monitoring cameras 10A which exist in the range surrounded by dotted-line frame h0 are determined as the correct information. In contrast, a camera location indicated by symbol i0 is independent from other camera locations. In this case, a feature quantity detection result acquired by monitoring camera 10A, which exists in the location indicated by symbol i0, is determined as the incorrect information. Dotted-line frame h0 may or may not be displayed on display 39.

In the map information between 13 and 14 o'clock of FIG. 7, a large number of camera locations are gathered in a range surrounded by dotted-line frame h1 in area RA. In this case, the feature quantity detection results acquired by monitoring cameras 10A which exist in the range surrounded by the dotted-line frame h1 are determined as the correct information. In contrast, five camera locations exist in places which are separated from the dotted-line frame h1, and the camera locations are independent from other camera locations. In this case, the feature quantity detection results acquired by monitoring cameras 10A which exist in the location indicated by symbol it is determined as the incorrect information. Dotted-line frame h1 may or may not be displayed on display 39.

As described above, in addition, since the location of dotted-line frame h0 is different from the location of dotted-line frame h1 in area RA, and thus map controller 36 can estimate that the victim is moving in area RA.

In the map information between 14 and 15 o'clock of FIG. 7, the maldistributed camera locations do not exist in area RA. Accordingly, the feature quantity detection results acquired by monitoring cameras 10A in area RA are determined that there is no correct information. Therefore, map controller 36 can estimate that there is a high possibility that the victim is separated from area RA between 14 and 15 o'clock. In this case, processes in S1 to S5 may be performed with respect to an area which is adjacent to area RA, for example, area RB.

Display 39 displays the map information between 12 and 13 o'clock, between 13 and 14 o'clock, and between 14 and 15 o'clock. In this case, display 39 may switch and display map information between 12 and 13 o'clock, between 13 and 14 o'clock, and between 14 and 15 o'clock according to a user instruction through input device 38, may sequentially switch and display like slide show, or may simultaneously display the map information of all time zones.

High frequency determination processor 34 in management device 30 determines the high frequency area with respect to the map information displayed in S5 according to the above-described clustering algorithm (S6). As a result of the high frequency area determination, for example, information of monitoring cameras 10A, which exist in dotted-line frame h1 included in the map information between 13 and 14 o'clock illustrated in FIG. 7, is extracted.

List controller 35 displays the information of monitoring cameras 10A in the high frequency area (for example, in dotted-line frame h1), which is determined by high frequency determination processor 34, on display 39 in a form of a list (table) (S7). Also, the information of monitoring cameras 10A in the high frequency area may be displayed in a form other than the list.

FIG. 8 is a table illustrating victim list LS1 in the high frequency area. In victim list LS1, for example, capturing time ("date and time" in FIG. 8), a camera number, a facial image, a full-length image, height, and a correct answer check item are set. In victim list LS1, for example, date and time: "13:22", camera number "No. 3", a facial image of a victim, a full-length image of the victim, height, and a correct answer check are registered in a table as the information of monitoring cameras 10A between 13 and 14 o'clock.

The correct answer check is an item which is acquired in such a way that a police officer who belongs to head office HO checks the victim by looking and adds a result thereof using a check mark. Looking by the police officer and adding of the check mark are performed through, for example, input device 38 and display 39 of management device 30. In a case where the check mark is added, list controller 35 determines that victim information is correct. In contrast, in a case where the check mark is not added, list controller 35 determines that the victim information is wrong. The correct answer check item may be omitted.

In victim list LS1 illustrated in FIG. 8, the victim information is registered through four dates and times. Particularly, victim information, which is monitored in the last time is the most important information for searching for the suspect. The reason for this is that the last time is conceivable as the closest to a current time situation.

List controller 35 transmits capturing time information as the search key with respect to monitoring cameras 10A which are registered in victim list LS1, and requests to transmit the feature quantities of people included in images captured in fixed time (for example, 1 minute) from the capturing time (S8).

For example, list controller 35 orders monitoring camera 10A corresponding to camera number "No. 4" registered in victim list LS1 to transmit the feature quantities of all the people who are captured within 5 minutes before and after capturing time 13:59. Communication device 31 transmits the feature quantities of all the people under the control of list controller 35.

In a case where monitoring camera 10A receives the capturing time information as the search key from management device 30, monitoring camera 10A stores the capturing time information in search key storage unit 25 within memory 14 (S9).

Feature checker 22 checks (performs the time check) capturing time included in the feature quantity which is stored in feature storage unit 24 and the capturing time as the received search key (S10).

In a case where both the capturing times in S10 are consistent with each other, communication device 15 transmits the feature quantities, such as facial images, full-length images, or height, of all the people who are captured in the fixed time (for example, before and after 5 minutes) from the capturing time as a check result (also referred to as time check result) to management device 30 (S11).

In management device 30, communication device 31 receives the feature quantities of all the people in the fixed time as the time check result from monitoring camera 10A, and feature checker 33 performs a mutual checking process (S12). In the mutual checking process, the same person who is photographed in each image in the fixed time is checked for each person. For example, in a case where 100 images exist, a feature quantity of a first image and feature quantities of second to 100-th images are checked, and the feature quantity of the second image and the feature quantities of the third to 100-th images are checked. Hereinafter, fourth and fifth images are also continuously checked by the same procedure. For example, it is determined that the same person is photographed in the first, fifth, and tenth images.

List controller 35 prepares a same person list LS2, in which a number of appearing times (clustering number) are listed in units of the same person in ascending order (in order of the number of times of appearances) as a result of the mutual checking process, and displays same person list LS2 on display 39 (S13). Also, a format of same person list LS2 is arbitrary, and may be prepared using another method.

FIG. 9 is a table illustrating same person list LS2. In same person list LS2, sorting is performed in an ascending order of the clustering number, and a suspect candidate counted as the same person and the clustering number are registered. In FIG. 9, in a first row, "person pa and 22 times" are registered. In a second row, "person pb and 3 times" are registered. In a third row, "person pc and 2 times" are registered.

List controller 35 in management device 30 specifies a person who has the largest clustering number (the largest number of times of appearances) as the suspect. This is based on estimation in which a person who has an extremely large clustering number, that is, a person who was with the victim and is not known is a suspect.

Also, it is assumed that the family of the victim was with the victim many times in addition to the suspect. In this case, the clustering number of the family may be the largest. Accordingly, setting may be performed such that the family of the victim is excluded from the suspect candidate through input device 38 or display 39 of management device 30. The setting may be performed in such a way that, for example, the thumbnail images displayed on display 39 are recognized by the user and the correct answer check item is used.

List controller 35 transmits the feature quantity of the same person who has the largest clustering number, that is, the suspect as the search key to each of monitoring cameras 10 which are installed in each of wide areas RA, RB, and RC including area RA (S14). Also, although an example in which wide areas RA, RB, and RC are set to transmission targets is provided, only area RA may be set to the transmission target, only areas RA and RB may be set to the transmission targets, or another area may be included.

Each of monitoring cameras 10, which are installed in wide areas RA, RB, and RC, maintains information of the feature quantity of the suspect, which is received from management device 30 by communication device 15, as the search key in search key storage unit 25 (S15).

Feature checker 22 checks (performs a suspect check) the feature quantity of the suspect stored in feature storage unit 24 and the feature quantity of the suspect as the received search key (S16).

In a case where both the feature quantities of the suspect are consistent with each other in S16 and a check result indicative of the same person is acquired, communication device 15 transmits the check result (suspect check result) indicative of the same person as the suspect to management device 30 (S17). As the suspect check result, for example, information relevant to the feature quantity, such as a thumbnail image (a facial image or a full-length image), a color of clothes, or height, of the suspect is transmitted in addition to the camera number and the capturing time.

In a case where map controller 36 receives the suspect check result from each of the monitoring cameras 10 through communication device 31, map controller 36 prepares map information MB in which the suspect check result is reflected, and displays map information MB on display 39 (S18).

Display 39 displays map information MB of areas RA, RB, and RC. In this case, display 39 may switch and display map information MB of each area according to the user instruction through input device 38, may sequentially switch and display map information MB of each of the areas like slide show, and may simultaneously display map information MB of all the areas.

High frequency determination processor 34 determines the high frequency area according to the above-described clustering algorithm based on information relevant to the feature quantity of the suspect, which includes the camera number and the capturing time of monitoring camera 10, and reflects the high frequency area in map information MB (S19).

Figure 10:
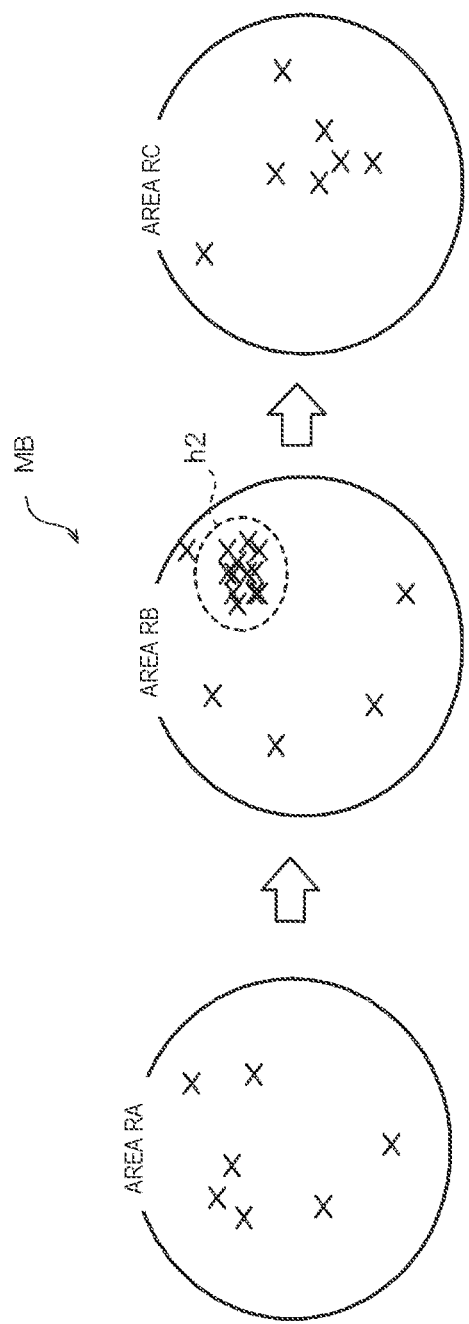
FIG. 10 is a diagram illustrating an example of the map information.

FIG. 10 is a diagram illustrating map information MB. In map information MB, the locations of monitoring cameras 10, which are installed for each of areas RA, RB, and RC and monitor the suspect, are indicated by symbol "x". Here, the wide area includes areas RB and RC, which are adjacent to area RA, in addition to area RA. In map information MB of area RB, the high frequency area, which is indicated by dotted-line frame h2, is included. Map controller 36 estimates that the suspect exits in the high frequency area which is indicated by dotted-line frame h2. Also, the high frequency area is, for example, a main life area of the suspect.

List controller 35 prepares a suspect list LS3 in which information relevant to the feature quantity of the suspect in the high frequency area is listed for each capturing time, and displays suspect list LS3 on display 39 (S20).

FIG. 11 is a table illustrating suspect list LS3 in the high frequency area. In suspect list LS3, items, such as capturing time ("date and time" in FIG. 11), a camera number, a facial image, a full-length image, and height, are set. Also, in FIG. 11, suspect list LS3 does not include the correct answer check item as illustrated in FIG. 8. However, suspect list LS3 may include the correct answer check item. A method of checking the correct answer check is the same as in the case of FIG. 8.

A police officer can grasp a current characteristic of the suspect (for example, appearance or features) and a location of the suspect from content of suspect list LS3 displayed on display 39.

Accordingly, in head office HO, the police officer can grasp the last time and area, which are estimated that the victim is located, based on the last victim capturing date and time (for example, "13:59") and the area (for example, area RB) which are registered in victim list LS1. In addition, the police officer can grasp the suspect based on the feature quantity of the suspect specified in same person list LS2. In addition, the police officer can grasp an area which is estimated that the suspect is located based on the high frequency area included in map information MB. Accordingly, head office HO can dispatch an investigator to the area which is estimated that the suspect is located. The investigator can search for the suspect based on the newest information of the suspect which is registered in suspect list LS3. Therefore, rapid incident settlement is expected.

Also, a mobile terminal (for example, a smart phone or a tablet terminal) which has a function of management device 30 may be possessed such that the investigator and another police officer can share information included in management device 30. The mobile terminal may be connected to management device 30 through, for example, network 50, and may be used as a cloud terminal. Furthermore, the mobile terminal itself may have each function, and may perform a process of realizing a function of management device 30. Therefore, the investigator can independently acquire the newest information of the suspect and the victim at a search spot.

[Advantages]

As described above, monitoring system 5 according to the embodiment includes a plurality of monitoring cameras 10 which capture images, and management device 30 to which monitoring cameras 10 are connected. Management device 30 transmits first feature information (for example, the search key, the feature quantity of the victim) relevant to a first person (for example, the victim) to one or more first monitoring cameras (for example, monitoring cameras 10 which are installed in area RA). Each of the first monitoring cameras performs a first check (for example, the victim check) with respect to a first image, which is captured by the first monitoring cameras (self-monitoring cameras) using the received first feature information, and transmits a first check result to management device 30. Management device 30 transmits time information (for example, capturing time information as the search key) based on time (for example, time in which the victim is lastly captured), in which the first image including the first person is captured, to second monitoring cameras (for example, monitoring camera 10 which performs capturing at 13:59 and has a camera number "4", and monitoring camera 10 which performs capturing at 13:22 and has a camera number "2"), which capture the first image relevant to the time information, among the first monitoring cameras based on the first check result. Each of the second monitoring cameras performs a second check (for example, the time check) with respect to a second image, which is captured by the second monitoring cameras (self-monitoring cameras), using the received time information, and transmits a second check result to management device 30. Management device 30 specifies a second person (for example, the suspect) based on the second check result.

Therefore, monitoring system 5 can specify the victim and the suspect in such a way that monitoring cameras 10 cooperate with management device 30, and can rapidly do a search. In addition, monitoring system 5 can estimate the suspect by collectively extracting people who are located around the victim based on the victim check. In addition, in a case where monitoring cameras 10 receive the search key from management device 30 and perform various checking processes with respect to the captured image, it is possible to reduce a processing load of management device 30 for searching for the victim and the suspect and it is possible to rapidly detect the victim and the suspect, compared to a case where management device 30 performs the various checks. In addition, in a case where the time check is performed using the time information, it is possible to search for suspect candidates based on, for example, time in which the victim is captured. In addition, in a case where the processing load of management device 30 is reduced, it is possible to avoid a situation in which the checking process performed by management device 30 is not in time and thus the suspect escapes even in a case where, for example, a specific person is traced using the plurality of monitoring cameras 10, unlike the case of Japanese Patent Unexamined Publication No. 2005-323046.

In addition, in a case where, for example, the images which are captured by monitoring cameras 10 are high-quality images (for example, 4K images), the amount of data of the images increases. Therefore, there is a possibility that network traffics become excessive in a case of communicating the captured images. In contrast, monitoring cameras 10 are capable of performing processes relevant to various checks in the device, and communicate with management device 30 only for the metadata and the feature quantities which are relevant to the images. Therefore, it is possible to avoid the network traffics becoming excessive.

In addition, management device 30 may transmit second feature information (for example, the search key and the feature quantity of the suspect) relevant to the specified second person to one or more third monitoring cameras (for example, monitoring cameras 10 installed in areas RA, RB, and RC) including the first monitoring cameras. Each of the third monitoring cameras may perform a third check (for example, suspect check) with respect to a third image, which is captured by the third monitoring cameras (self-monitoring cameras), using the received second feature information, and may transmit a third check result to management device 30.

Therefore, monitoring system 5 can estimate a current location in which the suspect is located from the locations of monitoring cameras 10. Accordingly, investigators easily search for the suspect.

In addition, each of the first monitoring cameras may perform the first check of detecting a feature quantity of the first person from the first image and checking the first feature information and the feature quantity of the first person. Each of the second monitoring cameras may perform the second check of checking the time information and time in which the second image where the feature quantity of the first person is detected is captured. Each of the third monitoring cameras may perform the third check of detecting the feature quantity of the second person from the third image and checking the second feature information and the feature quantity of the second person.

Therefore, in monitoring system 5, each of the checking processes is performed by monitoring cameras 10 instead of management device 30, and thus it is possible to reduce the processing load of management device 30. In addition, monitoring system 5 can be realized without transmitting data to management device 30 in order to perform each of the checks, and it is possible to reduce the amount of data to be transmitted to management device 30, and thus it is possible to reduce the amount of traffic of network 50.

As described above, in a case where processes, such as the feature detection and the feature quantity check, are performed with respect to the image, which is captured by monitoring cameras 10, it is possible to reduce the processing load of management device 30 of head office HO. In addition, it is possible to rapidly perform a process by monitoring cameras 10, and thus it is possible to search for the specific person (the victim or the suspect) from the images captured by a large number of monitoring cameras 10 in a short time.

In addition, management device 30 may display (for example, display in a form of a map) a location of each of the first monitoring cameras, which capture the first image including the first person who coincides with the first feature information, on display 39 based on the first check result.

Therefore, the user (for example, the police officer) of management device 30 can intuitively grasp the date and time, the time, and the location in which the victim is located from the map information displayed on display 39.

In addition, management device 30 may display the location of each of the first monitoring cameras, which capture the first person who coincides with the first feature information, for each capturing time (for example, between 12 and 13 o'clock, between 13 and 14 o'clock, and between 14 and 15 o'clock).

Therefore, the user of management device 30 can intuitively grasp a location where the victim (an example of the first person) is located for each time. In addition, in a case where the location of the victim is changed for each time, the user of management device 30 can recognize that the victim is moving. In addition, in a case where the location of the victim is regularly changed for each time (for example, the victim moves at an equal distance), the user of management device 30 can estimate a movement destination of the victim.

In addition, management device 30 may display (for example, display in the form of the map) a location of each of the third monitoring cameras, which capture the second person who coincides with the second feature information, on a display based on the third check result.

Therefore, the user of management device 30 can intuitively grasp the date and time, the time, and the location, in which the suspect is located, from the map information displayed on display 39.

In addition, in monitoring system 5, one or more monitoring cameras (for example, monitoring cameras 10A, 10B, and 10C) may be installed in each of a plurality of areas (for example, areas RA, RB, and RC). Management device 30 may display the location of each of the third monitoring cameras, which capture the second person who coincides with the second feature information, for each area.

Therefore, the user of management device 30 can suppose a location where the suspect (an example of the second person) is maldistributed and located among all the plurality of areas. For example, an area where the suspect is maldistributed may be estimated as the main life area of the suspect. The user of management device 30 can dispatch the investigator to the area.

In addition, the first check result may include at least one of the location of each of the first monitoring cameras (for example, the locations of monitoring cameras 10 which capture a person who coincides with the victim), a thumbnail image of the first image, and information of time in which the first image is captured. In a case where the location of each of the first monitoring cameras is maldistributed in a first area (for example, the area surrounded by dotted-line frame h1), management device 30 may display (for example, display in the form of the list) the first check result acquired by the first monitoring cameras installed in the first area.

Therefore, the user of management device 30 can grasp a person who is considered as the victim with reference to the list information displayed on display 39. For example, a location which is lastly captured by the first monitoring cameras becomes a last location of the victim, and thus it is possible to estimate that the victim is currently located around the last location. In addition, it is possible to grasp the feature of the victim with reference to the first check result, and the user of management device 30 becomes easy to perform search or becomes easy to instruct the search. In addition, in a case where the thumbnail image is transmitted and received between management device 30 and monitoring cameras 10, it is possible to reduce data transmission quantity between management device 30 and monitoring camera 10, compared to a case in which a moving image is transmitted and received.

In addition, the third check result may include at least one of the location of each of the third monitoring cameras (for example, the location of each of monitoring cameras 10 which capture a person who coincides with the suspect), a thumbnail image of the third image, and information of time in which the third image is captured. In a case where the location of each of the third monitoring cameras is maldistributed in a second area (for example, the area surrounded by dotted-line frame h2), management device 30 may display (for example, display in the form of the list) the third check result acquired by each of the third monitoring cameras installed in the second area.

Therefore, the user of management device 30 can grasp a person who is considered as the suspect with reference to the list information displayed on display 39. For example, there is a high possibility that the victim is located around a location which is frequently captured by the third monitoring cameras. In addition, the user of management device 30 can grasp the feature of the suspect with reference to the third check result. Therefore, the user of management device 30 becomes easy to perform search or becomes easy to instruct the search.

In addition, management device 30 may display the number of times of appearances for each person (for example, person a, b, or c) who appears in the second image on display 39, and may specify the second person based on the largest number of times of appearances.

In the second image, for example, the victim is photographed, and there is a high possibility that the suspect who is frequently photographed in the image is a person who is related to the victim. Therefore, the user of management device 30 can rapidly grasp a person who is considered as the suspect.

In addition, monitoring cameras 10 may be installed in each of a plurality of areas. An area (for example, area RA, RB, or RC) in which the third monitoring cameras are installed may be wider than an area in which the first monitoring cameras are installed (for example, area RA).

Therefore, it is possible to search for the suspect in an area wider than the area estimated that the victim is located. Accordingly, even in a case where the suspect moves between areas, there is a high possibility that it is possible to search for the suspect, and it is difficult for the suspect to run away.

In addition, each of monitoring cameras 10 includes image sensor 11, processor 13, and communication device 15. Image sensor 11 captures an image of a first person (for example, the victim). Processor 13 detects a feature quantity of the first person from the image. Communication device 15 receives first feature information relevant to the first person (for example, the search key or the feature quantity of the victim) from management device 30. Processor 13 performs a first check (for example, the victim check) of checking the first feature information and the feature quantity of the first person. Communication device 15 transmits a first check result to management device 30.

Therefore, each of monitoring cameras 10 can specify the victim and can rapidly do a search in association with management device 30. In addition, each of monitoring cameras 10 performs various checking processes with respect to the captured image, and thus it is possible to reduce the processing load of management device 30 in order to search for the victim and it is possible to rapidly detect the victim, compared to a case where the management device performs various checks.

In addition, processor 13 may detect the feature quantity of a second person (for example, the suspect) from the image. Communication device 15 may receive time information (for example, the search key) based on time (for example, time in which the victim is lastly captured) in which the image including the first person is captured. Processor 13 may perform a second check (for example, the time check) of checking the time information and the feature quantity of the second person. Communication device 15 may transmit a second check result to management device 30.

Therefore, each of monitoring cameras 10 can specify the suspect and can rapidly do a search in association with management device 30. In addition, each of monitoring cameras 10 performs various checking processes with respect to the captured image. Therefore, compared to a case where the management device performs various checks, it is possible to reduce the processing load of management device 30 in order to search for the suspect and it is possible to rapidly detect the suspect. In addition, each of monitoring cameras 10 performs the time check using the time information. Therefore, it is possible to search for suspect candidates based on, for example, time in which the victim is captured.

In addition, management device 30 includes processor 32 and communication device 31. Communication device 31 transmits first feature information (for example, the search key or the feature quantity of the victim) relevant to a first person (for example, the victim) to one or more first monitoring cameras (for example, monitoring cameras 10 which are installed in area RA). Communication device 31 receives a first check (for example, the victim check) result using the first feature information from each of the first monitoring cameras. Communication device 31 transmits time information (for example, the capturing time information as the search key) based on time (for example, time in which the victim is lastly captured), in which a first image including the first person is captured, to second monitoring cameras (for example, monitoring camera 10 which performs capturing at 13:59 and corresponds to camera number "4", and monitoring camera 10 which performs capturing at 13:22 and corresponds to camera number "2"), which capture the first image relevant to the time information, among the first monitoring cameras based on the first check result. Communication device 31 receives a second check (for example, the time check) result from each of the second monitoring cameras using the time information. Processor 32 specifies a second person (for example, the suspect) based on the second check result.

Therefore, management device 30 can specify the victim and the suspect, and can rapidly do a search in association with monitoring cameras 10. In addition, management device 30 entrusts the various checking processes with respect to the captured image to monitoring cameras 10. Therefore, compared to a case where management device 30 performs the various checks, it is possible to reduce the processing load of management device 30 in order to search for the victim and the suspect and it is possible to rapidly detect the suspect.

Another Embodiment

As described above, the first embodiment is described as an example of a technology of the present disclosure. However, the technology in the present disclosure is not limited thereto, and can be applied to an embodiment in which changes, replacements, additions, omissions, and the like are performed.

In the first embodiment, an example in which the feature quantity of the person included in the image is detected is provided. However, a feature quantity (for example, a type of a vehicle, a length of the vehicle, a color of the vehicle, or a vehicle speed) of a subject (for example, the vehicle) other than the person may be detected.

For example, processor 32 may determine a range of the wide area according to existence/non-existence of detection of the vehicle (that is, use of the vehicle) in the image. For example, in a case where a vehicle is detected, the range of the wide area may include areas RA, RB, RC, RD (not illustrated in the drawing), and RE (not illustrated in the drawing) by considering a possibility that the suspect is moving at a high speed using a vehicle. In addition, in a case where a vehicle is not detected, the wide area may include a range of areas RA and RB by considering that the suspect does not move too far.

In addition, processor 32 may determine the range of the wide area according to the vehicle speed as the feature quantity. For example, in a case where a high-speed movement, in which the vehicle speed is equal to or faster than a prescribed speed, is detected, the range of the wide area may include areas RA, RB, RC, RD (not illustrated in the drawing), and RE (not illustrated in the drawing) by considering the possibility that the suspect is moving at a high speed using the vehicle. In addition, in a case where a low-speed movement, in which the vehicle speed is slower than the prescribed speed, is detected, the wide area may include the range of areas RA and RB by considering that a movement distance by the vehicle is not too long.

In addition, processor 32 may determine the range of the wide area according to a type of the vehicle, such as a car, a motorcycle, or a bicycle.

In the first embodiment, an example in which processor 32 extracts and displays dotted-line frame h0, h1, or h2, which indicates the range of the high frequency area, according to the clustering algorithm, is provided. However, the range of the high frequency area may be manually input and display. For example, the camera locations, in which the feature quantity is detected, may be visually recognized by display 39, and an area, which is considered that camera locations are maldistributed at some extent or more, may be set as the high frequency area by input device 38.

In addition, in a case where dotted-line frame h0, h1, or h2 which indicates the range of the high frequency area, is close to a peripheral edge of the area, a neighboring area, which is adjacent to the close peripheral edge, may be designated as a search range for the victim and the suspect. For example, since dotted-line frame h1 is close to the peripheral edge of area A (a distance from the peripheral edge is included in a prescribed distance) between 13 and 14 o'clock, processor 32 may cause monitoring cameras 10B installed in area B to extract the feature quantity between 14 and 15 o'clock, together with monitoring cameras 10A installed in area A.

In the first embodiment, an example is provided in which processor 32 requests to transmit the feature quantity of the image to management device 30 in fixed time (for example, capturing time between 13 and 14 o'clock and before and after five minutes from time in which the image including the victim is lastly captured) from time in which the victim is recognized in the image captured by each of monitoring cameras 10. Also, processor 32 may request to transmit the feature quantity of the image, which is captured in a fixed distance (for example, in a prescribed distance from a location where the image including the victim is lastly captured) from a location where the victim is recognized in the image captured by each of monitoring cameras 10, to management device 30. In addition, processor 32 may request to transmit the feature quantity of the image, which is captured in the fixed time and in the fixed distance, to management device 30.

In addition, processor 32 may calculate a distance from coordinates (image location) of the captured image by considering a location in a depth direction of the image (captured image) captured by each of monitoring cameras 10. For example, in a case where the image is recognized that the victim and the suspect exist on a forefront side of the captured image, a distance on the image of the captured image is multiplied by a relatively small value, and thus an actual (actual space) distance is drawn. For example, in a case where the image is recognized that the victim and the suspect exist on a back side of the captured image, the distance on the image of the captured image is multiplied by a relatively large value, and thus an actual (actual space) distance is drawn. Therefore, it is possible to draw a location on the actual space according to a three-dimensional location of the captured image, and thus the user can grasp a sense of distance in actual space. Accordingly, search for the victim and the suspect by the investigator becomes easy.

In the first embodiment, an example in which one or zero high frequency area exists in each area is provided. However, two or more high frequency areas may exist in one area.

In the first embodiment, processor 13 or 32 may be physically formed in any manner. In addition, in a case where programmable processor 13 or 32 is used, it is possible to change processing content by changing the program, and thus it is possible to increase a degree of freedom for design of processor 13 or 32. Processor 13 or 32 may be formed by one semiconductor chip, or may be physically formed by a plurality of semiconductor chips. In a case where processor 13 or 32 is formed by the plurality of semiconductor chips, respective controls according to the first embodiment may be realized by the respective separate semiconductor chips. In this case, it is possible to consider that one processor 13 or 32 is formed by the plurality of semiconductor chips. In addition, processor 13 or 32 may be formed by a member (capacitor or the like) which has a separate function from the semiconductor chips. In addition, one semiconductor chip may be formed to realize a function of processor 13 or 32 and another additional function.

The present disclosure is available for a monitoring system, a monitoring camera, and a management device, in which it is possible to reduce a processing load of the management device and it is possible to rapidly detect a specific person.

What is claimed is:

1. A monitoring system, comprising:
   a plurality of monitoring cameras that capture a plurality of images, respectively, and that are positioned at a plurality of positions, respectively; and
   a management device coupled to the plurality of monitoring cameras and including:
   a processor configured to:
   perform a first check on the plurality of images captured by the plurality of monitoring cameras, respectively, based on first feature information relevant to a first person;
   detect that the first feature information is present in a first set of images of the plurality of images;
   determine that the first person is present in the first set of images;
   identify, using a clustering algorithm, a first set of cameras of the plurality of monitoring cameras that captured the first set of images, respectively, and a first set of positions of the plurality of positions corresponding to the first set of cameras, the first set of positions being clustered in a first high frequency area;
   determine a second set of cameras of the plurality of monitoring cameras, outside the first high frequency area, as having captured a second set of images of the plurality of images, respectively, and as having the first feature information mistakenly detected as being present in the second set of images; and cause a display to display a map including the first set of positions clustered in the first high frequency area and in which the first set of positions are distinctly identified, wherein the second set of cameras are not distinctly identified, wherein the second set of cameras of the plurality of monitoring cameras are different than the first set of cameras; and a controller configured to:
cause the display to display information associated with the first set of cameras including an identifier of each camera of the first set of cameras.

2. The monitoring system of claim 1, wherein the processor is configured to, after causing the display to display the map including the first set of positions in the first high frequency area, perform a second check on a plurality of subsequent images captured by the plurality of monitoring cameras, respectively, based on the first feature information relevant to the first person;

detect that the first feature information is present in a third set of images of the plurality of subsequent images;

determine that the first person is present in the third set of images;

identify a third set of cameras that captured the third set of images, respectively, and a second set of positions of the plurality of positions corresponding to the third set of cameras in a second high frequency area; and cause the display to display the map including the second set of positions in the second high frequency area.

3. The monitoring system of claim 2, wherein the first high frequency area is in a first geographic area and the second high frequency area is in a second geographic area, and wherein the processor is configured to track a movement of the first person based on a location of the first geographic area and a location of the second geographic area.

4. The monitoring system of claim 2, wherein the first set of cameras overlaps with the third set of cameras and the plurality of monitoring cameras include all cameras of the first and third sets of cameras.

5. The monitoring system of claim 2, wherein the display is configured to display a number of appearances of the first person in the first or third second sets of images, and wherein the processor is configured to determine number of appearances of the first person in the first or third sets of images.

6. A method, comprising:
capturing, by a plurality of monitoring cameras respectively positioned at a plurality of positions, a plurality of images, respectively;

causing, by a processor of a management device coupled to the plurality of monitoring cameras, a display to display a map including a first set of positions clustered in a first high frequency area by at least:

performing a first check on the plurality of images captured by the plurality of monitoring cameras, respectively, based on first feature information relevant to a first person;

detecting that the first feature information is present in a first set of images of the plurality of images;

determining that the first person is present in the first set of images; and identifying, using a clustering algorithm, a first set of cameras of the plurality of monitoring cameras that captured the first set of images, respectively, and the first set of positions of the plurality of positions corresponding to the first set of cameras, the first set of positions being clustered in the first high frequency area;

determining a second set of cameras of the plurality of monitoring cameras, outside the first high frequency area, as having captured a second set of images of the plurality of images, respectively, and as having the first feature information mistakenly detected as being present in the second set of images, wherein in the map the first set of positions are distinctly identified and the second set of cameras of the plurality of monitoring cameras are not distinctly identified, wherein the second set of cameras of the plurality of monitoring cameras are different than the first set of cameras; and causing, by a controller of the management device, the display to display information associated with the first set of cameras including an identifier of each camera of the first set of cameras.

7. The method of claim 6, comprising:
after causing the display to display the map including the first set of positions in the first high frequency area, performing a second check on a plurality of subsequent images captured by the plurality of monitoring cameras, respectively, based on the first feature information relevant to the first person;

detecting that the first feature information is present in a third set of images of the plurality of subsequent images;

determining that the first person is present in the third set of images;

identifying a third set of cameras that captured the third set of images, respectively, and a second set of positions of the plurality of positions corresponding to the third set of cameras in a second high frequency area; and causing the display to display the map including the second set of positions in the second high frequency area.

8. The method of claim 7, wherein the first high frequency area is in a first geographic area and the second high frequency area is in a second geographic area, and wherein the method comprises:

tracking a movement of the first person based on a location of the first geographic area and a location of the second geographic area.

9. The method of claim 7, wherein the first set of cameras overlaps with the third set of cameras and the plurality of monitoring cameras include all cameras of the first and third sets of cameras.

10. The method of claim 7, comprising:
determining, by the processor, a number of appearances of the first person in the first or third sets of images; and displaying the number of appearances of the first person in the first or third sets of images.

* * * * *